United States Patent
Yajima et al.

(10) Patent No.: US 10,425,023 B2
(45) Date of Patent: Sep. 24, 2019

(54) CONTROL DEVICE AND CONTROL METHOD OF ROTARY ELECTRIC MACHINE

(71) Applicant: HONDA MOTOR CO., LTD., Minato-ku, Tokyo (JP)

(72) Inventors: Shigeo Yajima, Tochigi-ken (JP); Makoto Tanaka, Tochigi-ken (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/049,858

(22) Filed: Jul. 31, 2018

(65) Prior Publication Data
US 2019/0052201 A1 Feb. 14, 2019

(30) Foreign Application Priority Data
Aug. 10, 2017 (JP) ................. 2017-155230

(51) Int. Cl.
| | |
|---|---|
| H02P 6/16 | (2016.01) |
| B60L 3/00 | (2019.01) |
| H02P 6/28 | (2016.01) |
| B60L 15/20 | (2006.01) |

(52) U.S. Cl.
CPC .............. *H02P 6/16* (2013.01); *B60L 3/0061* (2013.01); *B60L 15/20* (2013.01); *H02P 6/28* (2016.02)

(58) Field of Classification Search
CPC .... H02P 6/16; H02P 27/08; H02P 6/28; H02P 6/085; B60L 15/20; B60L 3/0061
See application file for complete search history.

(56) References Cited

U.S. PATENT DOCUMENTS

| | | | |
|---|---|---|---|
| 8,692,492 B2* | 4/2014 | Sato | H02P 6/06 318/400.12 |
| 2002/0116100 A1* | 8/2002 | Shimazaki | B60L 15/2045 701/22 |
| 2006/0125439 A1* | 6/2006 | Ajima | B60K 6/26 318/716 |
| 2008/0051959 A1 | 2/2008 | Ishihara et al. | |

(Continued)

FOREIGN PATENT DOCUMENTS

| | | |
|---|---|---|
| JP | 2002-247879 | 8/2002 |
| JP | 4587051 | 3/2008 |

(Continued)

OTHER PUBLICATIONS

Japanese Office Action for Japanese Patent Application No. 2017-155230 dated Mar. 5, 2019.

*Primary Examiner* — Thai T Dinh
(74) *Attorney, Agent, or Firm* — Amin, Turocy & Watson LLP (57) ABSTRACT

A motor control device performs rotation control of a motor by supplying a first driving waveform and a second driving waveform respectively to a pair of switching elements which make up part of upper and lower arms in an inverter circuit. The motor control device determines the amount of modulation of the second driving waveform from a combination of the calculated interpolation angle and the rotational speed of the motor. The motor control device generates the first driving waveform having a rectangular shape, and further generates the second driving waveform by performing pulse modulation by the determined amount of modulation.

6 Claims, 9 Drawing Sheets

(56) References Cited

U.S. PATENT DOCUMENTS

| | | | |
|---|---|---|---|
| 2010/0123418 A1* | 5/2010 | Itoh | H02P 21/0089 |
| | | | 318/400.02 |
| 2014/0340007 A1 | 11/2014 | Suhama et al. | |
| 2017/0110994 A1* | 4/2017 | Tanaka | H02P 6/16 |

FOREIGN PATENT DOCUMENTS

| JP | 5368777 | | 6/2010 |
| JP | 2011-259606 | | 12/2011 |
| JP | 5502605 | | 12/2011 |
| JP | 2011259606 A | * | 12/2011 |
| JP | 5781875 | | 4/2013 |

\* cited by examiner

FIG. 9B
(EMBODIMENT)

CONTROL DEVICE AND CONTROL METHOD OF ROTARY ELECTRIC MACHINE

CROSS-REFERENCE TO RELATED APPLICATION

This application is based upon and claims the benefit of priority from Japanese Patent Application No. 2017-155230 filed on Aug. 10, 2017, the contents of which are incorporated herein by reference.

BACKGROUND OF THE INVENTION

Field of the Invention

The present invention relates to a control device and a control method for performing rotation control of a rotary electric machine.

Description of the Related Art

Heretofore, a control device that performs rotation control of a rotary electric machine including a motor has been known. For example, various techniques for suppressing generation of an inrush current or torque ripple in a low-speed rotation region have been proposed.

In Japanese Patent No. 5502605, a control device that makes up for a deficiency of angular resolution due to the number of Hall sensors by interpolating the positions of magnetic poles (that is, the angle of rotation) of a rotor when performing rotation control of a brushless motor by using a plurality of Hall sensors is proposed.

SUMMARY OF THE INVENTION

However, with the device proposed in Japanese Patent No. 5502605, an interpolation method "for very-low-speed condition" or "for normal condition" is substantially selected depending on the rotational speed of the motor, and thus it may be difficult to perform rotation control for the purpose of ensuring higher positional accuracy. Therefore, concerning the device proposed in Japanese Patent No. 5502605, there is still a lot of room for improvement in terms of the flexibility of control design.

The present invention has been made to solve the above-described problem, and an object thereof is to provide a control device and a control method of a rotary electric machine, in which it is possible to execute finely tuned rotation control in accordance with a requirement for positional accuracy.

A control device of a rotary electric machine according to a first aspect of the present invention is a device for performing rotation control of the rotary electric machine by supplying a first driving waveform and a second driving waveform respectively to a pair of switching elements, which make up part of upper and lower arms in an inverter circuit. The control device includes: a plurality of rotation angle sensors fixedly disposed along the rotational direction of the rotary electric machine and configured to output detection signals in accordance with the angle of rotation of the rotary electric machine; an interpolation angle calculating unit configured to calculate an interpolation angle indicating the angle of rotation by interpolating a discrete angular level which is identified based on a combination of the detection signals obtained by the plurality of rotation angle sensors; a modulation amount determining unit configured to determine the amount of modulation of a driving waveform from a combination of the interpolation angle calculated by the interpolation angle calculating unit and the rotational speed of the rotary electric machine; and a driving waveform generating unit configured to generate the first driving waveform which is a rectangular driving waveform, and further generate the second driving waveform by performing pulse modulation on a rectangular driving waveform by the amount of modulation determined by the modulation amount determining unit.

As described above, the amount of modulation is determined from a combination of the interpolation angle and the rotational speed, and the second driving waveform is generated by performing pulse modulation by this amount of modulation, and thus it is possible to achieve control design with great flexibility which is suitable for the combination of the interpolation angle and the rotational speed, thereby making it possible to perform finely tuned rotation control in accordance with a requirement for positional accuracy. That is, it is possible to improve the controllability of the rotary electric machine without adopting an expensive device configuration (adding a high-resolution position sensor, for example).

Moreover, the control device may further include a map storing unit configured to store a modulation amount map having the interpolation angle and the rotational speed as input variables, and the amount of modulation as an output variable, and the modulation amount determining unit may determine the amount of modulation by reading the modulation amount map from the map storing unit and referring to the modulation amount map. By reading the modulation amount map stored in advance and referring to the modulation amount map, it is possible to obtain the amount of modulation directly without performing calculation every single time.

Furthermore, the map storing unit may store the modulation amount map obtained by combining a first characteristic curve indicating the relationship of the maximum amount of modulation to the interpolation angle and a second characteristic curve indicating the relationship of a modulation permission coefficient to the rotational speed.

A control method of a rotary electric machine according to a second aspect of the present invention is a method of performing rotation control of the rotary electric machine by supplying a first driving waveform and a second driving waveform respectively to a pair of switching elements, which make up part of upper and lower arms in an inverter circuit. The control method includes the steps of: acquiring detection signals in accordance with the angle of rotation of the rotary electric machine by using a plurality of rotation angle sensors fixedly disposed along the rotational direction of the rotary electric machine; calculating an interpolation angle indicating the angle of rotation by interpolating a discrete angular level which is identified based on a combination of the detection signals obtained by the plurality of rotation angle sensors; determining the amount of modulation of a driving waveform from a combination of the calculated interpolation angle and the rotational speed of the rotary electric machine; and generating the first driving waveform which is a rectangular driving waveform, and further generating the second driving waveform by performing pulse modulation on a rectangular driving waveform by the determined amount of modulation.

Moreover, the control method may further include the step of storing a modulation amount map having the interpolation angle and the rotational speed as input variables, and the amount of modulation as an output variable, and, in the determining step, the amount of modulation may be determined by reading the stored modulation amount map and referring to the modulation amount map.

Furthermore, in the storing step, the modulation amount map obtained by combining a first characteristic curve indicating the relationship of the maximum amount of modulation to the interpolation angle and a second characteristic curve indicating the relationship of a modulation permission coefficient to the rotational speed may be stored.

With the control device and the control method of the rotary electric machine according to the present invention, it is possible to perform finely tuned rotation control in accordance with a requirement for positional accuracy. That is, it is possible to improve the controllability of the rotary electric machine without adopting an expensive device configuration (adding a high-resolution position sensor, for example).

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a control device of a rotary electric machine according to the present invention will be described with reference to the attached drawings in connection with a control method of the rotary electric machine.

[Application Example of Motor Control Device 18]
<Configuration of Automated Guided Vehicle 10>

Figure 1:
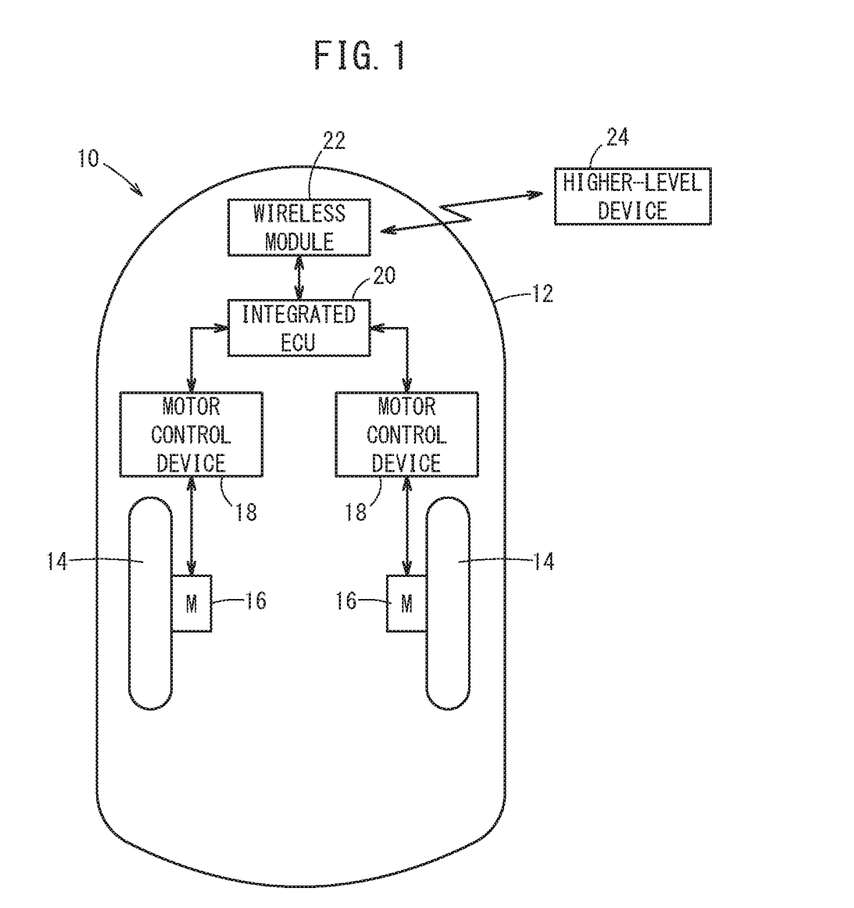
FIG. 1 is a schematic plan view of an automated guided vehicle into which a control device of a rotary electric machine according to an embodiment of the present invention is incorporated.

FIG. 1 is a schematic plan view of an automated guided vehicle 10 into which a control device (here, a motor control device 18) of a rotary electric machine according to an embodiment of the present invention is incorporated. The automated guided vehicle 10 is an unmanned conveyance carrier (an automated guided vehicle), and supplies and conveys various items in a factory, including parts, products in process, or finished products.

Specifically, this automated guided vehicle 10 is configured to include a vehicle body 12, right and left wheels 14 and 14, right and left motors 16 and 16 (rotary electric machines), right and left motor control devices 18 and 18, an integrated electronic control unit (ECU) 20, and a wireless module 22.

The integrated ECU 20 receives a command signal from a higher-level device 24 via the wireless module 22, and controls components of the automated guided vehicle 10 based on this command signal. Specifically, the integrated ECU 20 generates right and left speed command values based on the command signal from the higher-level device 24 and the travelling behavior of the automated guided vehicle 10, and supplies control signals including the speed command values to the right and left motor control devices 18 and 18.

The right-side motor control device 18 rotates the right wheel 14 at a desired rotational speed by performing rotation control of the right motor 16 based on the control signal from the integrated ECU 20. Likewise, the left-side motor control device 18 rotates the left wheel 14 at a desired rotational speed by performing rotation control of the left motor 16 based on the control signal from the integrated ECU 20.

<Overall Configuration of Motor 16>

Figure 2:
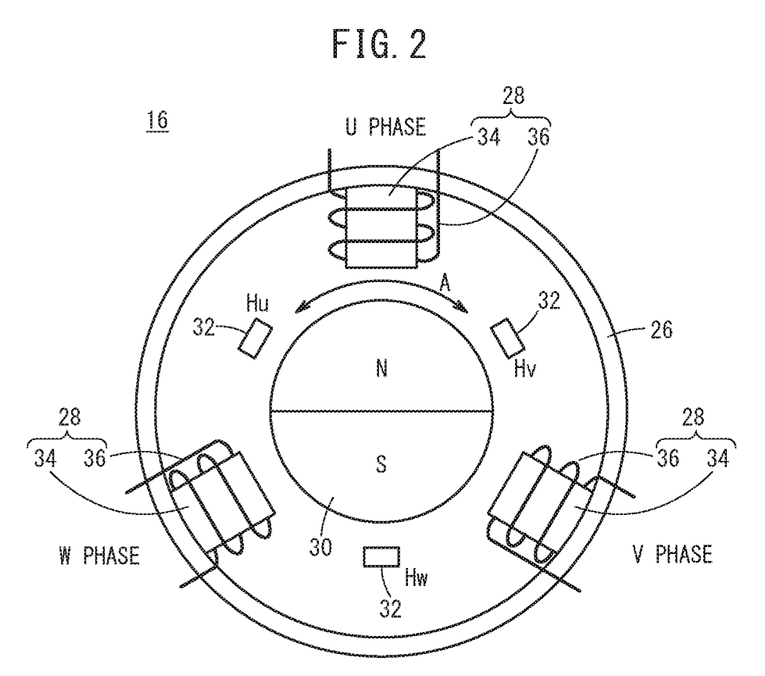
FIG. 2 is a sectional view schematically depicting principal portions of a motor of FIG. 1.

FIG. 2 is a sectional view schematically depicting principal portions of the motor 16 depicted in FIG. 1. This motor 16 is a three-phase brushless motor including a housing 26 in the shape of a hollow circular cylinder, three stators 28 which are provided on the inner wall of the housing 26, a circular cylindrical rotor 30 which is formed of a permanent magnet, and three Hall sensors 32 (rotation angle sensors).

Each of the U-phase, V-phase, and W-phase stators 28 includes a slot 34 and a stator coil 36 wound around the slot 34. The rotor 30 is formed of a permanent magnet having one set of magnetic poles (N pole and S pole), and configured so as to be capable of rotating in a clockwise or counterclockwise direction.

Each Hall sensor 32 is a noncontact magnetic sensor that detects change in the positions of the magnetic poles caused by the rotation of the rotor 30. The Hall sensors 32 are fixedly disposed at equiangular intervals in the rotational direction A of the rotor 30 (the motor 16). Hereinafter, the Hall sensor 32 located between the W-phase and U-phase stators 28 and 28, the Hall sensor 32 located between the U-phase and V-phase stators 28 and 28, and the Hall sensor 32 located between the V-phase and W-phase stators 28 and 28 are referred to respectively as "Hu", "Hv", and "Hw", in some cases.

The configuration of the motor 16 is not limited to the configuration illustrated in FIG. 2, and the motor 16 can adopt any of combinations of [1] an inner rotor type/an outer rotor type, [2] a surface permanent magnet (SPM) type/an interior permanent magnet (IPM) type, [3] the number of phases of the stator 28, [4] the number of slots of the stator 28, or [5] the number of poles (sets of poles) of the rotor 30.

When drive control of the automated guided vehicle 10 (FIG. 1) is performed, a higher level of positional accuracy is, in some cases, required as compared to other products and applications (for example, an electric cart). Specifically, there is a worry that, as a result of variations in control characteristics of the motors 16 in a low-speed rotation region, the synchronization performance of the right and left motors 16 is decreased, resulting in a decrease in the positional accuracy at the time of a stop or the straight-running stability at the time of start.

Thus, in the present invention, a control method (rectangular wave control of the "single-arm modulation type", which will be described later) that is capable of executing finely-tuned rotation control in accordance with a requirement for positional accuracy, even with a relatively inexpensive device configuration such as the motor 16 illustrated in FIG. 2 is proposed.

[Configuration of the Motor Control Device 18]

<Block Diagram>

Figure 3:
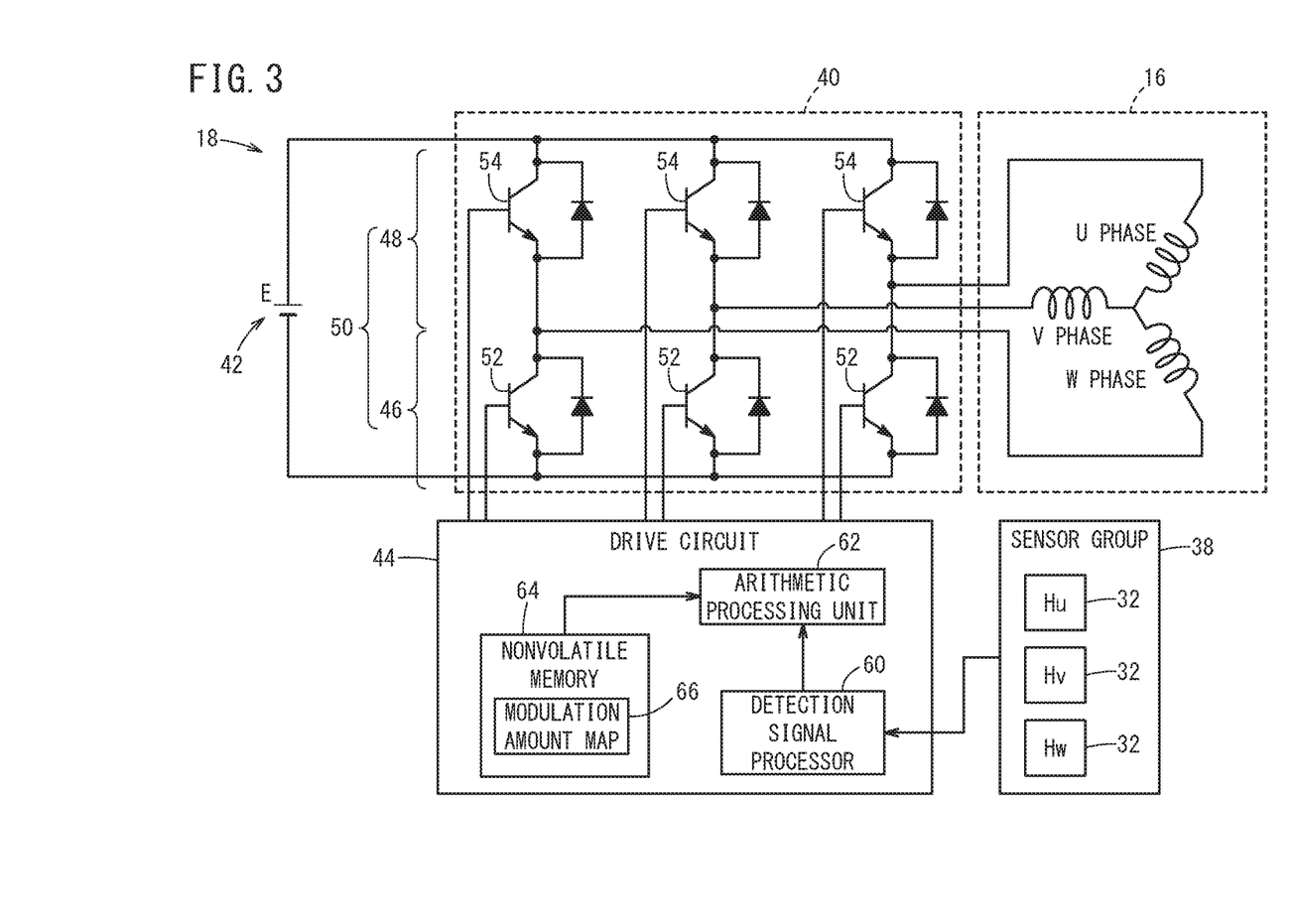
FIG. 3 is an electrical block diagram of the motor control device depicted in FIG. 1.

FIG. 3 is an electrical block diagram of the motor control device 18 depicted in FIG. 1. The motor control device 18 is configured to include an inverter circuit 40, a direct-current power supply 42, and a drive circuit 44.

The inverter circuit 40 is a power supply circuit that converts a direct current into an alternating current. The inverter circuit 40 is configured to include three lower arms 46 corresponding respectively to the U phase, the V phase, and the W phase of the motor 16, and three upper arms 48 corresponding respectively to the U phase, the V phase, and the W phase of the motor 16. Hereinafter, in some cases, the lower arms 46 and the upper arms 48 corresponding to the phases are collectively referred to as upper and lower arms 50.

Each lower arm 46 performs a switching operation (an ON and OFF operation) via one switching element 52. Each upper arm 48 performs a switching operation (an ON and OFF operation) via another switching element 54.

The drive circuit 44 is a control circuit that performs drive control of the inverter circuit 40. Specifically, the drive circuit 44 includes a detection signal processor 60, an arithmetic processing unit 62, and a nonvolatile memory 64 (a map storing unit).

After generating a level signal indicating an angular level from a combination of the detection signals obtained by a sensor group 38, the detection signal processor 60 supplies the level signal to the arithmetic processing unit 62. For example, if the three Hall sensors 32 are disposed as depicted in FIG. 2, the level signal represents six angular levels (the angular resolution is 60 degrees).

The arithmetic processing unit 62 is made up of a central processing unit (CPU) or a micro-processing unit (MPU), and based on the speed command value from an external device (the integrated ECU 20 of FIG. 1), generates and outputs a waveform signal (hereinafter referred to as a "driving waveform") for performing drive control of the inverter circuit 40.

The nonvolatile memory 64 is made up of a semiconductor memory including, for instance, an electrically erasable programmable read-only memory (EEPROM) and a flash memory. In the example of FIG. 3, the nonvolatile memory 64 stores therein a modulation amount map 66 (see FIG. 7), which will be described later.

Figure 4:
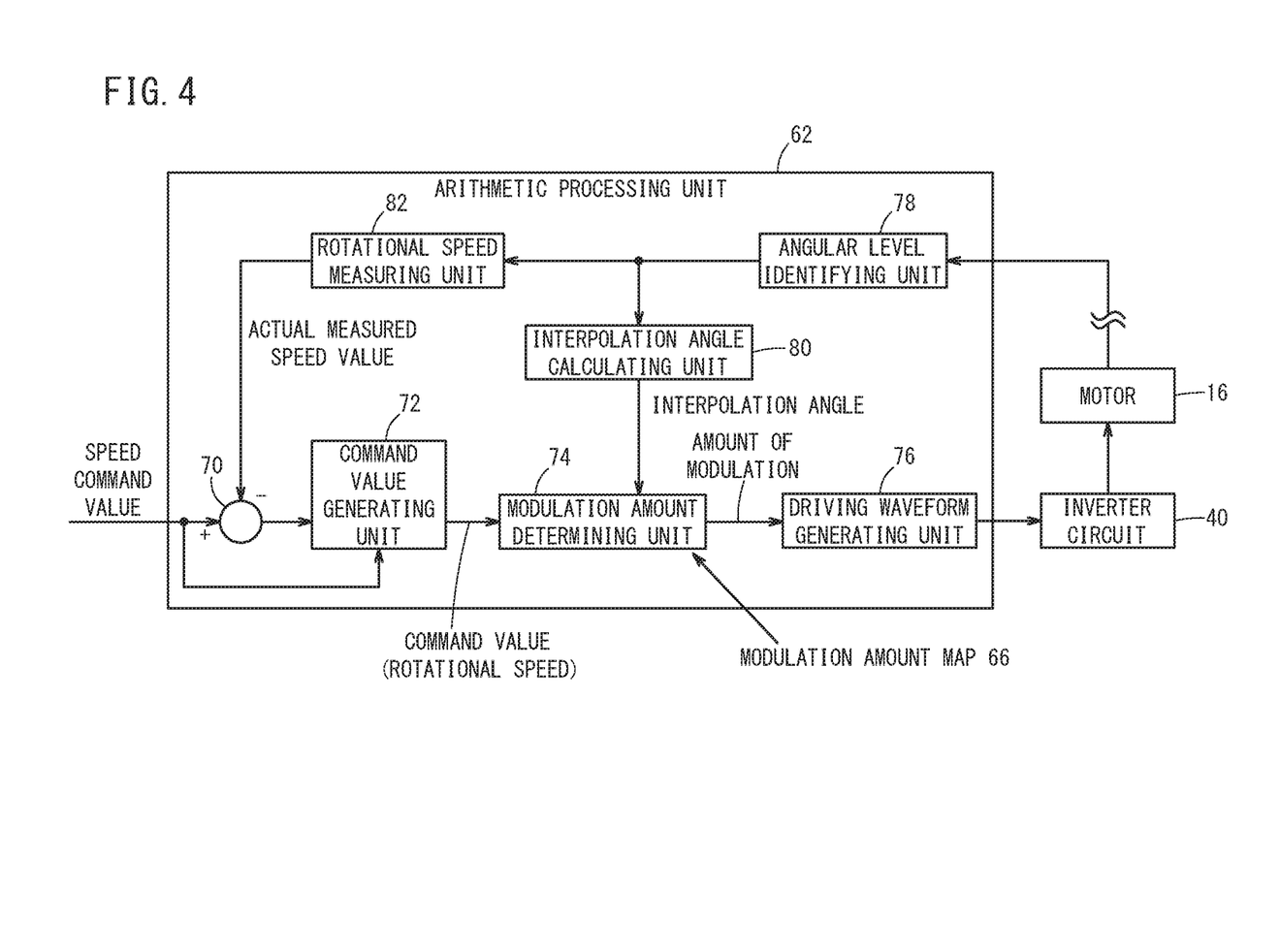
FIG. 4 is a functional block diagram of an arithmetic processing unit depicted in FIG. 3.

FIG. 4 is a functional block diagram of the arithmetic processing unit 62 depicted in FIG. 3. By reading and executing a program stored in a storing unit including the nonvolatile memory 64, this arithmetic processing unit 62 functions as a subtractor 70, a command value generating unit 72, a modulation amount determining unit 74, a driving waveform generating unit 76, an angular level identifying unit 78, an interpolation angle calculating unit 80, and a rotational speed measuring unit 82.

The subtractor 70 receives the speed command value from the integrated ECU 20 and an actual measured speed value from the rotational speed measuring unit 82, and outputs a value (hereinafter, a speed deviation) obtained by subtracting the actual measured speed value from the speed command value.

The command value generating unit 72 generates a command value (here, a target rotational speed) indicating the torque of the motor 16 by using the speed command value from the integrated ECU 20 and the speed deviation from the subtractor 70.

The modulation amount determining unit 74 converts the rotational speed from the command value generating unit 72 into the amount of pulse modulation (hereinafter referred to simply as "the amount of modulation") by reading the modulation amount map 66 from the nonvolatile memory 64 and referring to the modulation amount map 66. Here, the modulation amount map 66 is conversion information having an interpolation angle and a rotational speed as input variables and also having the amount of modulation as an output variable.

The driving waveform generating unit 76 generates a driving waveform of the inverter circuit 40, which is suitable for "single-arm modulation type", based on the amount of modulation from the modulation amount determining unit 74. Specifically, the driving waveform generating unit 76 generates first driving waveforms 88 (FIG. 8) which are rectangular driving waveforms in the U phase, the V phase, and the W phase, and supplies these first driving waveforms 88 to the switching elements 52 corresponding to the U phase, the V phase, and the W phase.

On the other hand, the driving waveform generating unit 76 generates second driving waveforms 92 (FIG. 8) in the U phase, the V phase, the W phase by performing pulse modulation on the rectangular driving waveforms by the amount of modulation obtained by the modulation amount map 66, and supplies these second driving waveforms 92 to the switching elements 54 corresponding to the U phase, the V phase, and the W phase. Here, when pulse modulation is performed by using pulse-width modulation (PWM) control, the amount of modulation corresponds to a duty ratio.

The angular level identifying unit 78 identifies a discrete angular level based on the level signal indicating the angular level of the motor 16. For example, if the angular resolution is 60 degrees, the discrete angular level is identified as one of the angular levels: 0, 60, 120, 180, 240, and 300 degrees.

The interpolation angle calculating unit 80 calculates an interpolation angle indicating the angle of rotation of the motor 16 by interpolating the angular level from the angular level identifying unit 78, and supplies this interpolation angle to the modulation amount determining unit 74 and the rotational speed measuring unit 82. The interpolation angle calculating unit 80 may calculate the above-described interpolation angle by using various calculation methods including the method described in Japanese Patent No. 5502605, for example.

The rotational speed measuring unit 82 measures the rotational speed of the motor 16 by dividing the amount of change in the interpolation angle before and after a sampling time by the sampling time. Then, the rotational speed measuring unit 82 supplies the measured rotational speed (hereinafter, the actual measured speed value) to the subtractor 70.

<Numerical Characteristics of Modulation Amount Map 66>

Next, the numerical characteristics of the modulation amount map 66 will be described with reference to FIGS. 5A to 7. This modulation amount map 66 corresponds to a three-dimensional map obtained by combining [1] a first characteristic curve 84 indicating the relationship of the maximum amount of modulation to the interpolation angle and [2] a second characteristic curve 86 indicating the relationship of a modulation permission coefficient to the rotational speed.

Figure 5A:
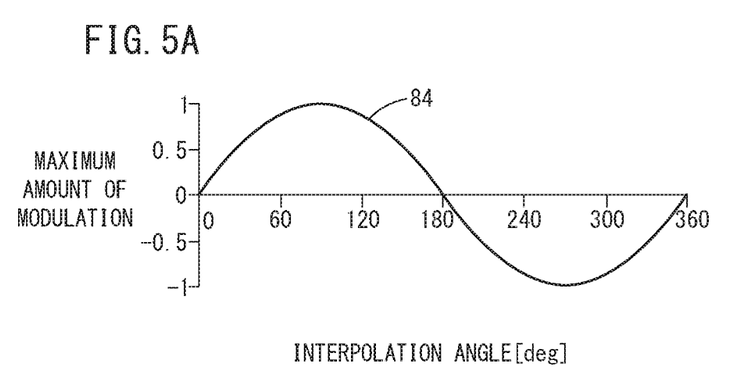
FIGS. 5A to 5C are diagrams, each depicting an example of a first characteristic curve.
Figure 5B:
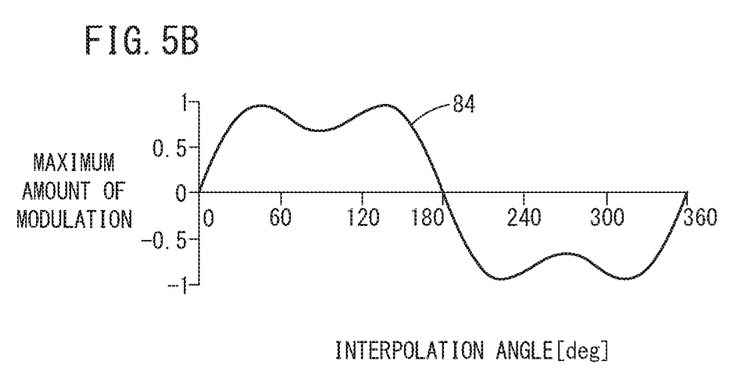
Figure 5C:
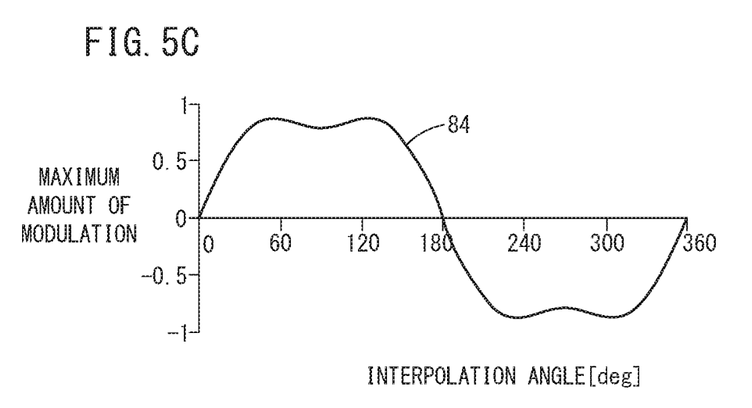

[1] In each of FIGS. 5A to 5C, the horizontal axis of the graph represents the interpolation angle (unit: deg) and the vertical axis of the graph represents the maximum amount of modulation (unit: dimensionless). The first characteristic curve 84 is designed with consideration given to, for example, the characteristics of the motor 16, the number and placement of magnets in the motor 16, and the occurrence of a current ripple.

FIG. 5A shows the shape of a curve including only a first-order component corresponding to one turn of the motor 16. FIG. 5B shows the shape of a curve obtained by adding a third-order component to the first characteristic curve 84 of FIG. 5A. FIG. 5C shows the shape of a curve obtained by adding to the first characteristic curve 84 of FIG. 5B a higher-order component (a component of an order higher than or equal to a fifth order).

Figure 6:
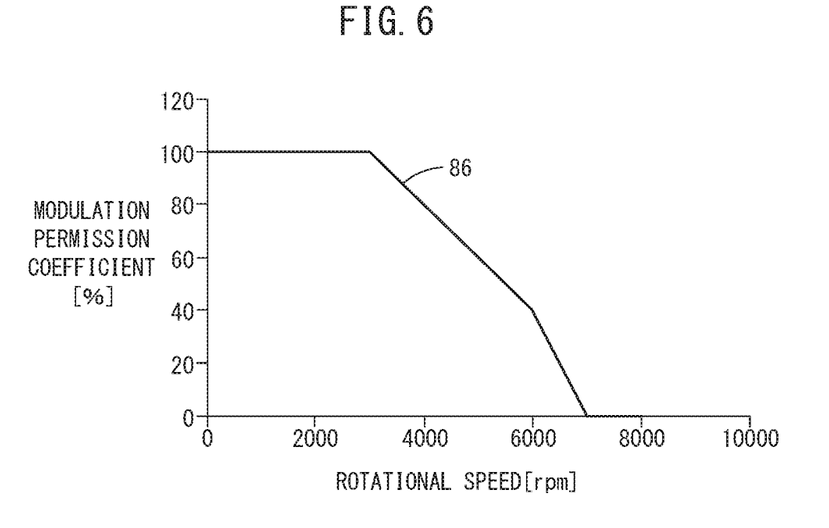
FIG. 6 is a diagram depicting an example of a second characteristic curve.

[2] FIG. 6 is a diagram depicting an example of the second characteristic curve 86. The horizontal axis of the graph represents the rotational speed (unit: rpm) and the vertical axis of the graph represents the modulation permission coefficient (unit: %). In the example of FIG. 6, when the rotational speed is within the range between 0 [rpm] and 3000 [rpm], the modulation permission coefficient is 100% (the value is 1). When the rotational speed exceeds 7000 (rpm), the modulation permission coefficient is 0% (the value is 0). On the other hand, when the rotational speed is within the range between 3000 [rpm] and 7000 [rpm], the modulation permission coefficient monotonically decreases as the rotational speed increases.

That is, in a low-speed rotation region, since the direct-current power supply 42 can sufficiently supply a voltage (Vpn), pulse modulation is actively performed to bring the driving waveform close to a sinusoidal wave. On the other hand, in a high-speed rotation region, since it is necessary to increase output power to the motor 16, pulse modulation is not performed, and thus the driving waveform is kept rectangular.

Figure 7:
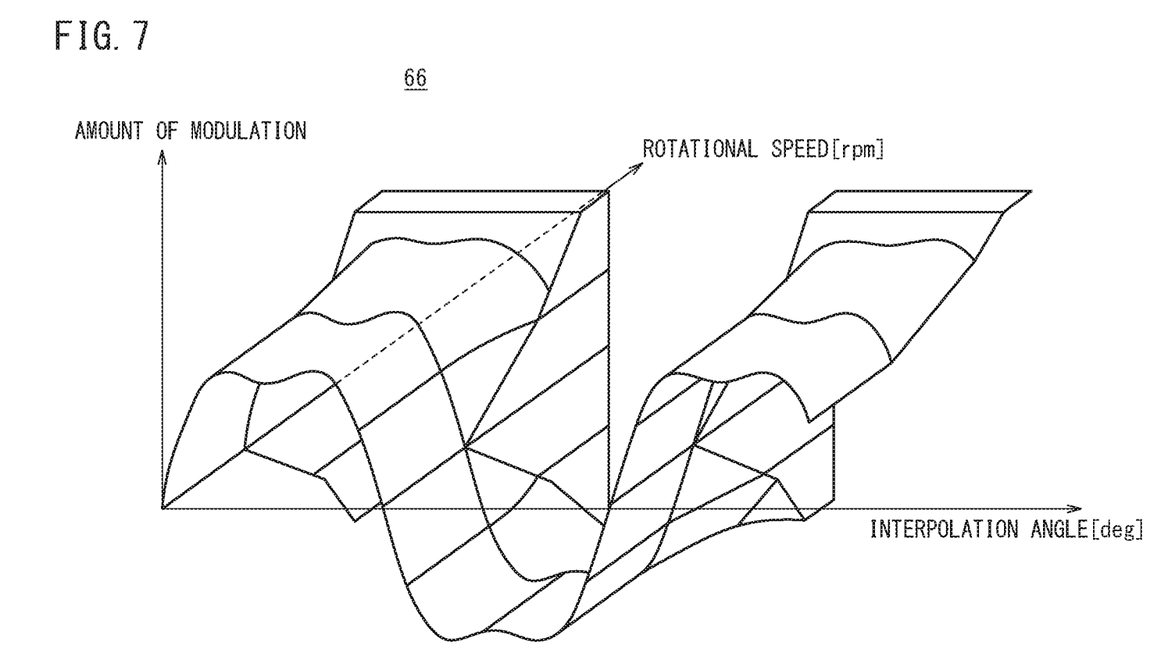
FIG. 7 is a diagram depicting an example of a modulation amount map.

[3] FIG. 7 is a diagram depicting an example of the modulation amount map 66. The first axis of the graph represents the rotational speed (unit: rpm), the second axis of the graph represents the interpolation angle (unit: deg), and the third axis represents the amount of modulation (unit: dimensionless). The modulation amount map 66 depicted in FIG. 7 is obtained by combining the first characteristic curve 84 shown in FIG. 5A and the second characteristic curve 86 shown in FIG. 6.

Specifically, when a rectangular wave function is denoted by Rect, the maximum amount of modulation is denoted by Mo, and the modulation permission coefficient (see FIG. 6) is denoted by C, the amount of modulation M is given by the following formula (1).

$$M = \text{Rect} - C(\text{Rect} - \text{Mo}) \quad (1)$$

[Operation of Motor Control Device 18]
<Waveform Diagram>

Referring back to FIG. 3, the drive circuit 44 performs drive control of the inverter circuit 40 based on the speed command value from the integrated ECU 20 (FIG. 1) and the detection signals of the motor 16 obtained by the sensor group 38. Here, the arithmetic processing unit 62 of the drive circuit 44 generates a driving waveform obtained by performing pulse modulation on one of the rectangular waves, while being based on rectangular wave control.

Figure 8:
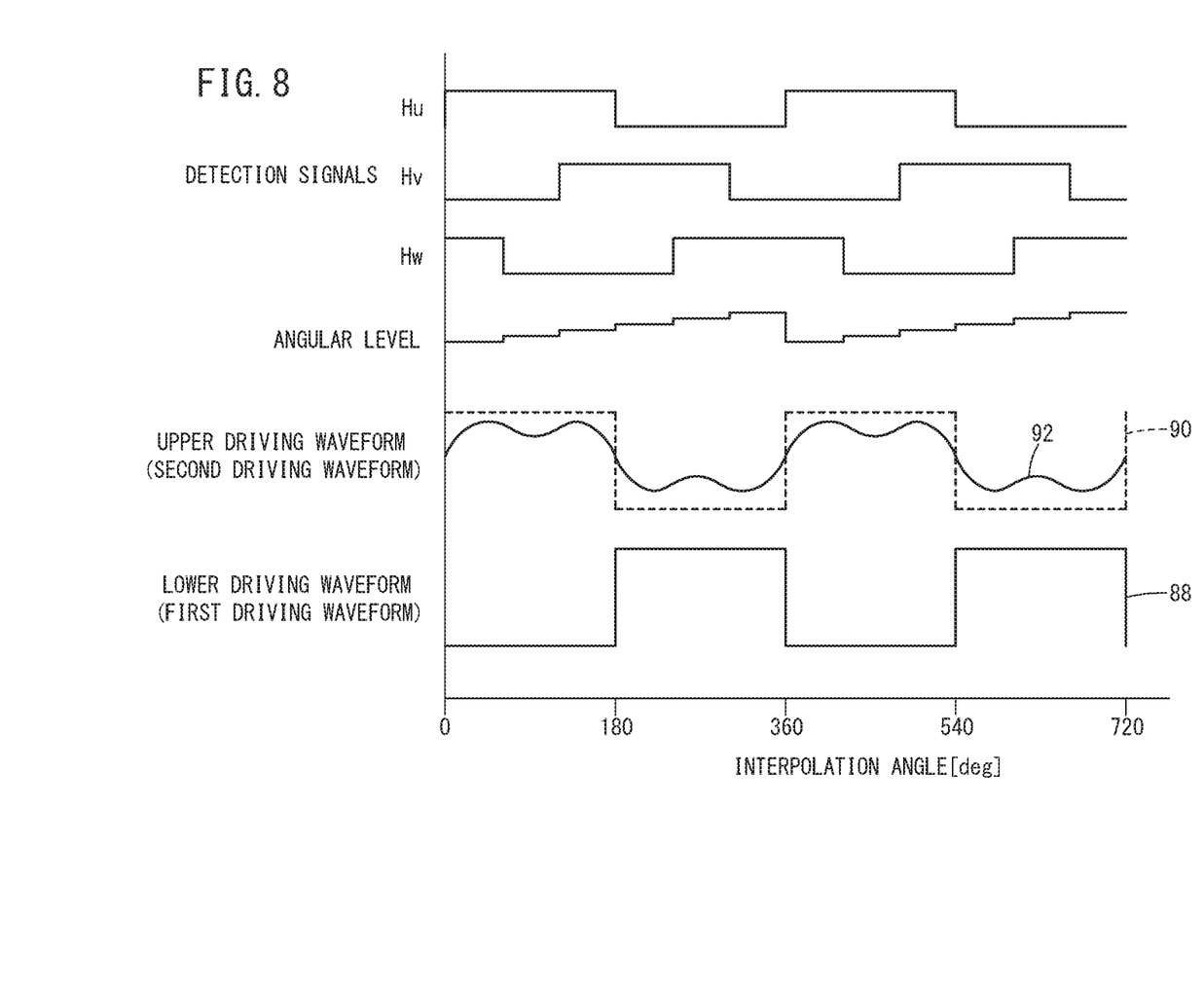
FIG. 8 is a waveform diagram of detection signals, an angular level, and driving waveforms.

FIG. 8 is a waveform diagram of the detection signals, the angular level, and the driving waveforms. More specifically, FIG. 8 shows, beginning at the top, the detection signals of "Hu", "Hv", and "Hw", the angular level, the upper driving waveform of the U phase (the second driving waveform 92), and the lower driving waveform of the U phase (the first driving waveform 88).

In the case of "normal" rectangular wave control, the first driving waveform 88 (indicated by a solid line) which is a rectangular driving waveform, and a rectangular driving waveform 90 (indicated by a dashed line) which is opposite in phase with respect to the first driving waveform 88 are generated. On the other hand, in the case of rectangular wave control of the "single-arm modulation type", by performing pulse modulation on the rectangular driving waveform 90 based on the modulation amount map 66, the second driving waveform 92 (indicated by a solid line) having a pseudo sinusoidal shape is obtained.

The driving waveforms of the V phase correspond to waveforms obtained by advancing the phases of the driving waveforms (the first driving waveform 88 and the second driving waveform 92) of the U phase by 120 degrees. Likewise, the driving waveforms of the W phase correspond to waveforms obtained by delaying the phases of the driving waveforms (the first driving waveform 88 and the second driving waveform 92) of the U phase by 120 degrees.

<Verification Result of Operation>

Next, the verification result of the operation by this motor control device 18 will be described with reference to FIGS. 9A and 9B. Here, straight-running stability at the time when the automated guided vehicle 10 starts moving is evaluated.

Figure 9A:
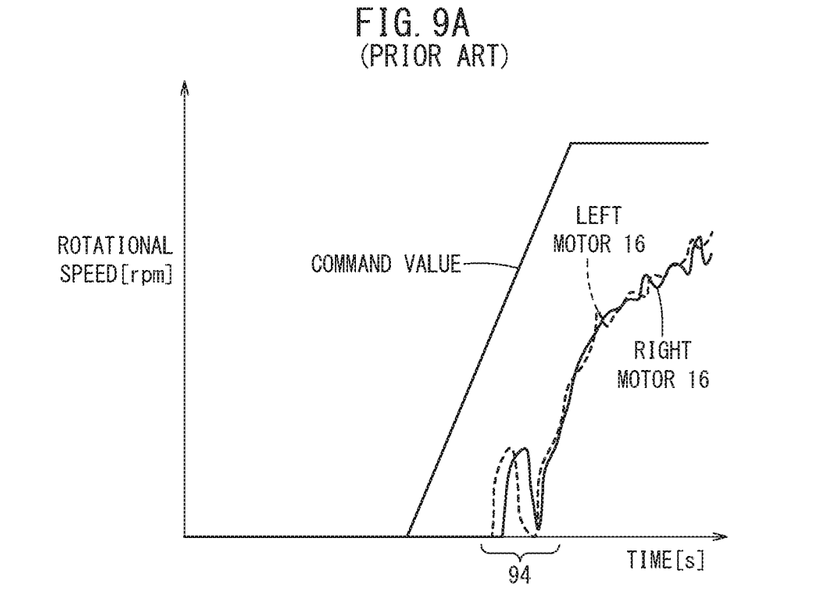
FIG. 9A is a diagram showing temporal changes in the rotational speeds of right and left motors in normal rectangular wave control (prior art)

FIG. 9A is a diagram showing temporal changes in the rotational speeds of the right and left motors 16 in normal rectangular wave control. FIG. 9B is a diagram showing temporal changes in the rotational speeds of the right and left motors 16 in rectangular wave control of the single-arm modulation type. In FIGS. 9A and 9B, the horizontal axis of the graph represents the time (unit: s) and the vertical axis of the graph represents the rotational speed (unit: rpm).

Here, it is assumed that the integrated ECU 20 (FIG. 1) synchronously issues commands to the right and left motor control devices 18 to accelerate the motors 16 at a constant rate of acceleration during a period from when the motors 16 are at rest (0 rpm) until when a target speed is reached.

As depicted in FIG. 9A, in a rising time region 94, since the rotational speed of the right motor 16 rises later than that of the left motor 16, microscopic variation occurs between the rotational speeds of the motors 16. That is, there is a high possibility that, when the automated guided vehicle 10 starts moving, straight-running stability is impaired.

Figure 9B:
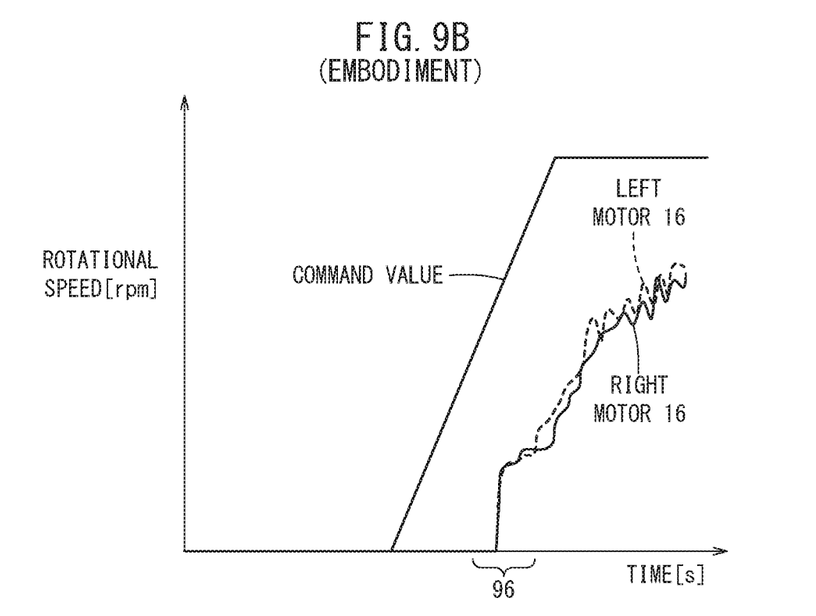
FIG. 9B is a diagram showing temporal changes in the rotational speeds of the right and left motors in rectangular wave control of the single-arm modulation type (the present embodiment).

As depicted in FIG. 9B, in a rising time region 96, since the rotational speeds of the right and left motors 16 rise substantially simultaneously, variation between the rotational speeds of the motors 16 are greatly reduced. That is, when the automated guided vehicle 10 starts moving, high straight-running stability is obtained.

[Effects Produced by the Motor Control Device 18]

As described above, the motor control device 18 is [1] a device that performs rotation control of the motor 16 (the rotary electric machine) by supplying the first driving waveform 88 and the second driving waveform 92 respectively to a pair of switching elements 52 and 54, which make up part of the upper and lower arms 50 in the inverter circuit 40. The motor control device 18 includes: [2] a plurality of Hall sensors 32 (rotation angle sensors) that are fixedly disposed in the rotational direction A of the motor 16 and configured to output detection signals in accordance with the angle of rotation of the motor 16; [3] the interpolation angle calculating unit 80 configured to calculate an interpolation angle indicating the angle of rotation by interpolating a discrete angular level which is identified based on the detection signals; [4] the modulation amount determining unit 74 configured to determine the amount of modulation of a driving waveform from a combination of the calculated interpolation angle and the rotational speed of the motor 16; and [5] the driving waveform generating unit 76 configured to generate the first driving waveform 88 which is a rectangular driving waveform, and further generate the second driving waveform 92 by performing pulse modulation by the determined amount of modulation.

Moreover, a control method of the motor 16, which is performed by using the motor control device 18, is [1] a method of performing rotation control of the motor 16 (the rotary electric machine) by supplying the first driving waveform 88 and the second driving waveform 92 respectively to a pair of switching elements 52 and 54, which make up part of the upper and lower arms 50 in the inverter circuit 40. The control method includes the steps of: [2] acquiring detection signals in accordance with the angle of rotation of the motor 16 by using a plurality of Hall sensors 32 (rotation angle sensors) which are fixedly disposed in the rotational direction A of the motor 16; [3] calculating an interpolation angle indicating the angle of rotation by interpolating a discrete angular level which is identified based on the detection signals; [4] determining the amount of modulation of a driving waveform from a combination of the calculated interpolation angle and the rotational speed of the motor 16; and [5] generating the first driving waveform 88 having a rectangular shape, and further generating the second driving waveform 92 by performing pulse modulation by the determined amount of modulation.

In particular, when the relatively inexpensive motor 16 (a combination of a brushless motor and Hall sensors) depicted in FIG. 2 is used, a problem can occur that responsiveness and the positional accuracy are decreased. To address this problem, the amount of modulation is determined from a combination of the interpolation angle and the rotational speed, and the second driving waveform 92 is generated by performing pulse modulation by this amount of modulation, and thus it is possible to achieve a control design with great flexibility which is suitable for the combination of the interpolation angle and the rotational speed, thereby making it possible to perform finely tuned rotation control in accordance with a requirement for positional accuracy. That is, it is possible to improve the controllability of the motor 16 without adopting an expensive device configuration (adding a high-resolution position sensor, for example).

Furthermore, the motor control device 18 may further include the nonvolatile memory 64 (the map storing unit) configured to store the modulation amount map 66 having the interpolation angle and the rotational speed as input variables and the amount of modulation as an output variable. The modulation amount determining unit 74 may determine the amount of modulation by reading the modulation amount map 66 from the nonvolatile memory 64 and referring to the modulation amount map 66. By reading the modulation amount map 66 stored in advance and referring to the modulation amount map 66, it is possible to obtain the amount of modulation directly without performing calculation every single time.

Furthermore, the nonvolatile memory 64 may store the modulation amount map 66 obtained by combining the first characteristic curve 84 indicating the relationship of the maximum amount of modulation to the interpolation angle and the second characteristic curve 86 indicating the relationship of a modulation permission coefficient to the rotational speed.

[Supplemental Remarks]

It goes without saying that this invention is not limited to the embodiment described above, and any changes or modifications can be made thereto within the scope of this invention. Alternatively, the configurations can be arbitrarily combined unless a technical contradiction arises.

For example, in the present embodiment, the first driving waveform 88 is supplied to the switching element 52 of the lower arm 46, and the second driving waveform 92 is supplied to the switching element 54 of the upper arm 48, but the supply destinations may be interchanged. That is, the drive circuit 44 may supply the first driving waveform 88 to the switching element 54 of the upper arm 48, and the second driving waveform 92 to the switching element 52 of the lower arm 46.

Moreover, in the present embodiment, an example in which the motor 16 as an electric motor is applied to the automated guided vehicle 10 has been described; however, the type and use application of the rotary electric machine are not limited to the above combination. For example, in addition to the motor 16, the type of rotary electric machine may be a generator or a motor generator. Moreover, the rotary electric machine may be applied to an electric vehicle including a hybrid vehicle, an electric vehicle, a fuel-cell vehicle, an electric motorcycle, and an electric bicycle, or industrial facilities.

What is claimed is:

1. A control device for performing rotation control of a rotary electric machine by supplying a first driving waveform and a second driving waveform respectively to a pair of switching elements which make up part of upper and lower arms in an inverter circuit, the control device comprising:
    a plurality of rotation angle sensors fixedly disposed along a rotational direction of the rotary electric machine and configured to output detection signals in accordance with an angle of rotation of the rotary electric machine;
    an interpolation angle calculating unit configured to calculate an interpolation angle indicating the angle of rotation by interpolating a discrete angular level which is identified based on a combination of the detection signals obtained by the plurality of rotation angle sensors;
    a modulation amount determining unit configured to determine an amount of modulation of a driving waveform from a combination of the interpolation angle calculated by the interpolation angle calculating unit and a rotational speed of the rotary electric machine; and
    a driving waveform generating unit configured to generate the first driving waveform which is a rectangular driving waveform, and further generate the second driving waveform by performing pulse modulation on a rectangular driving waveform by the amount of modulation determined by the modulation amount determining unit.

2. The control device according to claim 1, further comprising:
    a map storing unit configured to store a modulation amount map having the interpolation angle and the rotational speed as input variables, and the amount of modulation as an output variable,
    wherein the modulation amount determining unit determines the amount of modulation by reading the modulation amount map from the map storing unit and referring to the modulation amount map.

3. The control device according to claim 2, wherein the map storing unit stores the modulation amount map obtained by combining a first characteristic curve indicating a relationship of a maximum amount of modulation to the interpolation angle and a second characteristic curve indicating a relationship of a modulation permission coefficient to the rotational speed.

4. A control method of performing rotation control of a rotary electric machine by supplying a first driving waveform and a second driving waveform respectively to a pair of switching elements which make up part of upper and lower arms in an inverter circuit, the control method comprising the steps of:

acquiring detection signals in accordance with an angle of rotation of the rotary electric machine by using a plurality of rotation angle sensors fixedly disposed along a rotational direction of the rotary electric machine;

calculating an interpolation angle indicating the angle of rotation by interpolating a discrete angular level which is identified based on a combination of the detection signals obtained by the plurality of rotation angle sensors;

determining an amount of modulation of a driving waveform from a combination of the calculated interpolation angle and a rotational speed of the rotary electric machine; and generating the first driving waveform which is a rectangular driving waveform, and further generating the second driving waveform by performing pulse modulation on a rectangular driving waveform by the determined amount of modulation.

5. The control method according to claim 4, further comprising the step of storing a modulation amount map having the interpolation angle and the rotational speed as input variables, and the amount of modulation as an output variable, wherein in the determining step, the amount of modulation is determined by reading the stored modulation amount map and referring to the modulation amount map.

6. The control method according to claim 5, wherein, in the storing step, the modulation amount map obtained by combining a first characteristic curve indicating a relationship of a maximum amount of modulation to the interpolation angle and a second characteristic curve indicating a relationship of a modulation permission coefficient to the rotational speed is stored.

* * * * *